H. R. LIEBSTEIN.
LATHE TOOL HOLDER.
APPLICATION FILED OCT. 10, 1913.
1,161,056.
Patented Nov. 23, 1915.
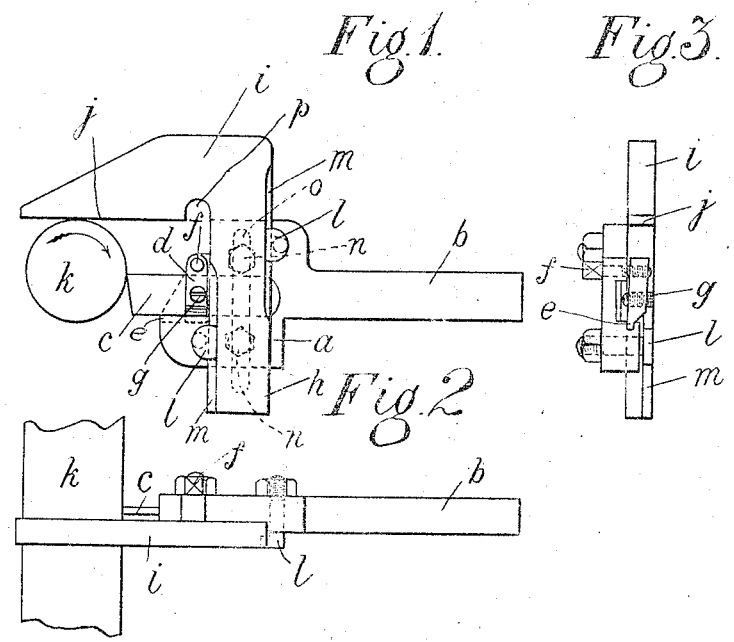
Witnesses
A. G. Liebstein
W. Crossley
Inventor
Hermann Roy Liebstein

UNITED STATES PATENT OFFICE.

HERMANN ROY LIEBSTEIN, OF PUTNEY, ENGLAND.

LATHE TOOL-HOLDER.

1,161,056. Specification of Letters Patent. Patented Nov. 23, 1915.

Application filed October 10, 1913. Serial No. 794,470.

*To all whom it may concern:*

Be it known that I, HERMANN ROY LIEBSTEIN, a subject of the King of Great Britain and Ireland, residing at Putney, in the county of Surrey, England, have invented certain new and useful Improvements in Lathe Tool-Holders; and I do hereby declare the following to be a full, clear, and exact description of the invention, such as will enable others skilled in the art to which it appertains to make and use the same.

This invention consists in certain improvements in lathe-tool holders, the object being to provide means for lessening or preventing the liability which some lathe-tools have, parting and screw-cutting ones for instance, to dig into the work, and even to break their own points. To achieve the above mentioned object it has already been proposed to provide a bar steady which presses on the top of the work, and my present invention comprises an improved form of bar which is moreover adjustably attached to the tool-holder itself, and is set parallel with the direction in which the tool-holder is fed toward the work.

In the accompanying drawing is shown an effective way in which my invention can be carried into practice, Figure 1 being a side view, Fig. 2 a plan, and Fig. 3 an end view, and I may here premise that when in use the bar is set so as just to touch the work when the lathe is at rest, and is also placed sufficiently on one side of the tool to clear that part of the work which is being operated on.

I provide a tool-holder $a$ the shank $b$ of which fits into the lathe tool box in the usual manner, and the tool $c$, in the case shown, a cutter, is held in the holder by a plate $d$ the lower edge of which fits into a groove at $e$, a screw $f$ holding the plate $d$ to the holder $a$, and a set-screw $g$ passing through the plate $d$ permits of tools of various thicknesses to be accommodated.

In one face of the holder $a$ is a recess in which is free to slide the tail-piece $h$ of the bar steady $i$ at right-angles thereto, the said bar steady having a flat under surface $j$ which rests on the top of the work $k$, parallel with the direction in which the holder $a$ is fed toward the work. The tail-piece $h$ is held to the holder by bolts $l$ passing through the holder and having straight-sided overhanging heads to slide in rabbets $m$ in the tail-piece $h$. For the bolts $l$ may be substituted set-screws $n$ passing through slots $o$ in the tail-piece $h$, into the holder $a$. A recess $p$ in the under edge of the bar steady $i$ enables the bar to be brought low to suit small work without coming in contact with the plate $d$. With a tool-holder provided with a bar as above mentioned, overhang from the lathe-tool box is immaterial, and thus the whole length of the tool can be placed in front of the shank of the tool-holder, which renders it possible to employ a deep section cutter even in lathes where the vertical distance between the center of the work and the surface of the tool box on which the shank of the tool-holder rests, is small, which is the case in many English lathes.

What I claim as my invention and desire to secure by Letters Patent is:—

In a lathe-tool holding device, the combination of a tool-holder recessed to receive the tool and having a shank to fit the lathe-tool box; means for retaining the tool in the recess during use; a holding-down bar having a vertical shank to fit a recess in the tool holder, and having a horizontal arm projecting from its upper end so as to extend over the work; and bolts passed through the holder and having heads which engage with rabbets in the outer edges of the said vertical shank of the holding-down bar, as hereinbefore described.

In testimony whereof, I affix my signature, in presence of two witnesses.

HERMANN ROY LIEBSTEIN.

Witnesses:
  TRACY LAY,
  ORLANDO J. WORTH.